United States Patent

Marco

[15] 3,697,659

[45] Oct. 10, 1972

[54] AMINE CONTAINING ANIMAL FEED COMPOSITIONS

[72] Inventor: Gino J. Marco, Webster Groves, Mo.

[73] Assignee: Monsanto Company, St. Louis, Mo.

[22] Filed: Oct. 28, 1968

[21] Appl. No.: 771,331

Related U.S. Application Data

[63] Continuation-in-part of Ser. Nos. 504,997, Oct. 24, 1965, abandoned, and Ser. No. 583,080, Sept. 29, 1966, abandoned.

[52] U.S. Cl. ................................................424/325
[51] Int. Cl. ..........................A61k 27/00, A23k 1/16
[58] Field of Search.......................................424/325

[56] References Cited

UNITED STATES PATENTS

| | | | |
|---|---|---|---|
| 3,192,113 | 6/1965 | Pushegy et al. | 424/325 |
| 3,226,293 | 12/1965 | Ursprung | 424/325 |
| 3,252,864 | 5/1966 | Klaui | 424/325 |
| 3,336,136 | 8/1967 | Peeler | 99/22 |
| 3,397,990 | 8/1968 | Hochstein | 99/2 |
| 3,432,603 | 3/1969 | Zenitz | 424/325 |

*Primary Examiner*—Sam Rosen
*Attorney*—Neal E. Willis, Paul C. Krizov and Robert C. Griesbauer

[57] ABSTRACT

Animal feed compositions comprising certain amino compounds are useful for stimulating the growth of animals and improving feed efficiency.

15 Claims, No Drawings

AMINE CONTAINING ANIMAL FEED COMPOSITIONS

This application is a continuation-in-part of copending applications Ser. No. 504,997, filed Oct. 24, 1965 and Ser. No. 583,080 filed Sept. 29, 1966 both now abandoned.

This invention relates to animal feed compositions and to methods of improving growth response in animals.

The term "aliphatic" as used herein means cycloaliphatic as well as straight and branched chain aliphatic.

The term "fat acid" as used herein means naturally occurring and synthetic monobasic aliphatic acids including the branched and straight chain, saturated, mono- and polyethylenically unsaturated, and mono- and polyacetylenically unsaturated acids.

The term "dibasic acid" as used herein means naturally occurring and synthetic dibasic aliphatic acids including the branched and straight chain, saturated, mono- and polyethylenically unsaturated, and mono- and polyacetylenically unsaturated acids.

The term "hydrocarbyl" as used herein means those radicals which result from the removal of a hydrogen atom from hydrocarbon compounds.

In accordance with the present invention it has been found that certain classes of amino compounds are useful growth promotants for animals. Animal diets containing these amino compounds elicit a substantially greater weight gain and feed efficiency response in animals then when said diets are used alone. This increase in weight gain and feed efficiency is wholly unexpected in view of that disclosed heretofore.

The improved weight gain and feed efficiency response in animals is accomplished in accordance with this invention by a method which comprises orally administering to the animal an amino compound selected from the following:

(a) polymeric amine having at least two units selected from the group consisting of

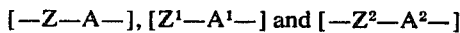

wherein A, A$^1$ and A$^2$ are each divalent aliphatic hydrocarbon of at least 2 and not more than 48 carbon atoms; and Z, Z$^1$ and Z$^2$ are each selected from the group consisting of

and,

wherein R is hydrocarbyl of not more than 20 carbon atoms, R$^1$ and R$^2$ are each selected from the group consisting of hydrogen and hydrocarbyl of not more than 20 carbon atoms, and X is an anion;

(b)
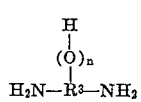

wherein R$^3$ is an aliphatic hydrocarbon of at least two and not more than 40 carbon atoms and n is zero or one;

(c)

wherein R$^4$, R$^5$ and R$^6$ are each selected from the group consisting of hydrogen, alkyl of not more than 20 carbon atoms, and alkenyl of not more than 20 carbon atoms; provided that the sum of the carbon atoms is at least 6 and not more than about 40 and a maximum of two of R$^4$, R$^5$ and R$^6$ are hydrogen;

(d)

wherein R$^7$, R$^8$ and R$^9$ are each selected from the group consisting of alkyl of not more than 20 carbon atoms and hydroxyalkyl of not more than 20 carbon atoms, provided that the sum of the carbon atoms are at least eight and not more than 40;

(e) $R^{10} - O - (CH_2)_c - NH_2$ wherein R$^{10}$ is selected from the group consisting of alkyl of not more than 18 carbon atoms, alkenyl of not more than 18 carbon atoms and mixtures of alkyl radicals derived by hydrogenation of a carboxylic acid obtained by the saponification of animal or vegetable oils, and c is an integer from two to four inclusive;

(f)
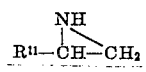

wherein R$^{11}$ is alkyl of not more than 18 carbon atoms;

(g) $(R^{12})_b - N - [(CH_2CH_2O)_y - H]_{3-b}$ wherein R$^{12}$ is aliphatic hydrocarbon radical of not more than 20 carbon atoms, y is an integer from one to 30 inclusive, and b is an integer from 1 to 2 inclusive;

(h) $[H-(OCH_2CH_2)_y - HN]_a - R - [NH - (CH_2CH_2O)_y - H]_b$ wherein R is a divalent aliphatic hydrocarbon of at least two and not more than 40 carbon atoms, y is an integer from 1 to 30 inclusive, and a and b are each integers from 0 to 2 inclusive, provided that the sum of a and b is at least 1; and (i)
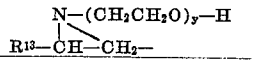

wherein R$^{13}$ is alkyl of not more than 18 carbon atoms and y is an integer from 1 to 30 inclusive.

The above defined amino compounds are useful in animal feeds generally, for example, poultry, swine and ruminant feeds, but they are particularly advantageous when employed in ruminant feeds for cattle and sheep.

The amino compounds useful in the present invention defined above in (a) are straight and branched chain polymeric amines and are hereinafter referred to as polymeric amines.

In the polymeric amines above, A, $A^1$ and $A^2$ can be the divalent hydrocarbon derived from, for example, alkanes such as ethane, propane, butane, pentane, hexane, heptane, octane, nonane, decane, undecane, dodecane, tridecane, tetradecane, pentadecane, hexadecane, heptadecane, octodecane, nondecane, eicosane, heneicosane, docosane, tricosane, tetracosane, pentacosane, hexacosane, heptacosane, octocosane, noncosane, triacontane, hentriacontane, dotriacontane, pentatriacontane, tetracontane and the various homologues and isomers of alkanes having not more than 48 carbon atoms; alkenes such as ethylene, propylene, butylene, amylene, hexylene, heptylene, octylene, nonylene, decylene, cetene, eicosene, cerotene, melene and the various homologues and isomers of alkenes having not more than 48 carbon atoms; alkynes such as pentyne, hexyne, heptyne, octyne, decyne, dodecyne, tridecyne, tetradecyne, pentadecyne, hexadecyne, octodecyne and the various homologues and isomers of alkynes having not more than 48 carbon atoms; cycloalkanes and alkyl substituted cycloalkanes such as cyclopropane, cyclobutane, cyclopentane, cyclohexane, cycloheptane, cyclooctane, cyclononane, mono- and polymethylcyclohexane, cyclooctane, and the like and mono- and polyethylcyclohexane, cyclooctane, and the like; cycloalkylalkanes such as cyclopentylmethane, cyclooctylethane and the like; cycloalkenes and alkyl substituted cycloalkenes such as cyclopropene, cyclobutene, cyclopentene, cyclohexene, cycloheptadecene, mono- and polymethylcyclopentene and the like, and mono- and polyethylcyclohexene and the like; cycloalkenylalkanes such as cyclopentenylmethane, cyclohexenylpropane and the like; dimerized fat acids prepared by polymerizing branched and straight chain, saturated, mono- and polyethylenically unsaturated, and mono- and polyacetylenically unsaturated monobasic fat acids; and dibasic acids.

Typical saturated, branched and straight chain fat acid monomers include, for example, caprylic acid, pelargonic acid, capric acid, lauric acid, myristic acid, palmitic acid, isopalmitic acid, stearic acid, archidic acid, behenic acid, carnaubic acid and the like. Typical branched and straight chain mono- and polyethylenically unsaturated fat acid monomers include, for example, 3-octenoic acid, 11-dodecanoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoloiodonic acid, chaulmoogric acid, and the like. Typical branched and straight chain mono- and polyacetylenically unsaturated fat acid monomers include, for example, 10-undecynoic acid, tariric acid, stearolic acid, behenolic acid, isamic acid, and the like.

Typical saturated, branched and straight chain dibasic acids include, for example, adipic acid, pimelic acid, suberic acid, azelaic acid, sebacic acid, brassic acid, brassylic acid, roccellic acid and the like. Typical branched and straight chain ethylenically unsaturated dibasic acids include, for example allylmalonic acid, propylidenemalonic acid, hydromuconic acid, pyrocinchonic acid, allylsuccinic acid, carbocaprolactonic acid, teraconic acid, zeronic acid, cetylmalonic acid and the like. Typical branched and straight chain acetylenically unsaturated dibasic acids include, for example, hexynedioic acid and the like.

Representative, R, $R^1$ and $R^2$ hydrocarbyl for the polymeric amines include by way of example alkyl such as methyl, ethyl, n-propyl, isopropyl, n-butyl, sec-butyl, isobutyl, tert-butyl, amyl, hexyl, heptyl, octyl, nonyl, decyl, dodecyl, tetradecyl, hexadecyl, octadecyl and the various homologues and isomers of alkyl of not more than 20 carbon atoms, alkenyl such as vinyl, allyl, n-butenyl-1, n-butenyl-2, n-pentyl-2, n-hexenyl-2, 2,3-dimethylbutenyl-2, n-heptenyl, n-decenyl, n-dodocenyl and the various homologues and isomers of alkenyl, of not more than 20 carbon atoms, alkynyl such as ethynyl, propargyl, 3-hexynyl and the various homologues and isomers of alkynyl of not more than 20 carbon atoms, cycloalkyl and alkyl substituted cycloalkyl (three to 20 carbon atoms) such as cyclopentyl, cyclohexyl, mono- and polymethylcyclohexyl, mono- and polyethylcyclohexyl, cycloheptyl and the like, cycloalkylalkyl such as cyclopentylethyl, cyclohexylmethyl and the like; cycloalkyl and alkyl substituted cycloalkenyl (3 to 20 carbon atoms) such as cyclopentenyl, cyclohexenyl, cycloheptenyl, mono- and polymethylcyclohexenyl, mono- and polyethylcyclohexenyl and the like, cycloalkenylalkyl such as cycloheptenylethyl, cyclopentenylmethyl and the like, aryl (six to 20 carbon atoms) such as phenyl, biphenyl, naphthyl, and the like, aralkyl (seven to 20 carbon atoms) such as benzyl, phenylethyl, 3-phenylpropyl, diphenylmethyl and the like, and alkaryl (seven to 20 carbon atoms) such as tolyl, ethylphenyl, xylyl, n-butylphenyl, tert-butylphenyl, trimethylphenyl, diethylphenyl, methylpropylethylphenyl and the like.

In formula (a) above X can be anion, inorganic or organic. When X represents a quaternary ammonium anion, it will generally be a halide anion, for example, Cl or Br. When X represents the anion of an acid addition salt, it can be an anion derived from inorganic acids such as hydrochloric acid, hydrobromic acid, sulfuric acid, phosphoric acid, nitric acid, and the like, and organic acids such as acetic acid, bromoacetic acid, trichloroacetic acid, benzoic acid, 2,4-dinitrobenzoic acid, succinic acid, tartaric acid, phthalic acid and the like.

The polymeric amines useful in this invention are known in the art and many of them are commercially available materials. The polymeric secondary amines can be prepared by condensation polymerization of a dinitrile, i.e., hydrogenation of dinitrile under secondary amine-forming conditions. An alternate route for the polymerization of polymeric secondary amines involves polymerization of diprimary diamines under secondary amine-forming conditions. The polymeric tertiary amines can be prepared from the polymeric secondary amines by alkylation with an organic halide in the presence of an equivalent amount of aqueous basic material. The polymeric quaternary amines can be prepared from the polymeric secondary amines by quaternization with excess organic halide and aqueous base. Polymeric quaternary amines wherein $R^1$ and $R^2$ represent different hydrocarbyl groups are prepared by first alkylating the polymeric secondary amine with one organic halide to form the polymeric tertiary amine and then quaternizing the polymeric tertiary amine with a second organic halide.

If less than one equivalent of organic halide is used for every amine group in the polymeric secondary amine, the polymer obtained has randomly mixed secondary and tertiary amine groups, for example

Likewise, if more than one but less than two equivalents of organic halide are used for every amine group in the polymeric secondary amine, the polymer obtained has randomly mixed tertiary amine and quaternary ammonium groups, for example

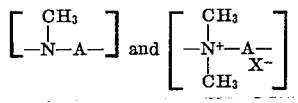

Polymeric amines containing a mixture of secondary amine, tertiary amine and quaternary ammonium groups are prepared by partial alkylation of a polymeric amine having mixed secondary amine and tertiary amine groups. Such polymeric amines contain a mixture of, for example, the randomly mixed groups

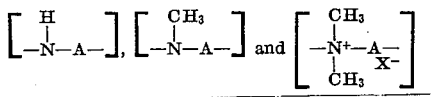

Copolymeric secondary, tertiary and quaternary amines are also useful in accordance with this invention. They are readily prepared by copolymerizing mixtures of two or more dinitriles or two or more diprimary diamines. Such copolymers are represented by, for example, I. secondary amine copolymers having the randomly distributed units,

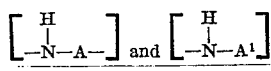

II. tertiary amine copolymers having the randomly distributed units, for example,

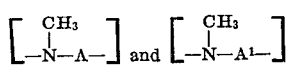

III. quaternary ammonium copolymers having the randomly distributed units, for example,

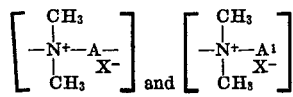

where A and $A^1$ are as defined above.

Copolymeric amines prepared by polymerizing mixtures of two or more dinitriles of dimerized fat acids, and by polymerizing mixtures of a dinitrile of a dimerized fat acid and a dinitrile of a dibasic acid are particularly useful in accordance with this invention. Polymeric tertiary and quaternary amine copolymers are prepared from the polymeric secondary copolymers in accordance with the procedures set forth above for the preparation of polymeric tertiary and quaternary homopolymers.

The acid addition salts of the polymeric secondary and polymeric tertiary amine are prepared from inorganic acids such as hydrochloric acid, hydrobromic acid, sulfuric acid, phosphoric acid, nitric acid, and the like, and organic acids such as acetic acid, bromoacetic acid, trichloroacetic acid, benzoic acid, 2,4-dinitrobenzoic acid, succinic acid, tartaric acid, phthalic acid, and the like. The acid addition salts of polymeric secondary amines can be represented by, for example, polymers containing the unit

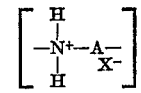

The end groups of the polymeric secondary amines are generally primary amine groups where the polymers are prepared by condensation of diprimary diamines. The end groups of the polymeric secondary amines are generally nitrile groups where the polymers are prepared by condensation of dinitriles. However, under certain conditions of polymerization with dinitriles some chains terminate in nitrile groups whereas other chains terminate in amine groups. Where severe reaction conditions are employed, the degradation of functional groups can cause some chains to terminate in hydrocarbon groups. When the polymeric secondary amines are alkylated to polymeric tertiary amines or quaternized to polymeric quaternary amines, the amino end groups of the polymeric secondary amine will generally be alkylated or quaternized along with the amino group within the chain. Thus the polymeric amines which are useful in this invention comprise at least two units selected from the group consisting of

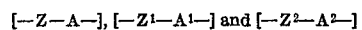

wherein the end groups of the polymer are selected from the class consisting of hydrogen, amine, nitrile and hydrocarbon groups, and Z, $Z^1$, $Z^2$, A, $A^1$ and $A^2$ are as defined above.

The polymeric amines useful in this invention vary in molecular weight from dimers where the number of units in the polymer chain is two to high molecular weight polymers where the number of units in the polymer chain is 100 or greater.

The preferred polymeric amines for use in accordance with this invention are those which comprise at least two units selected from the group consisting of

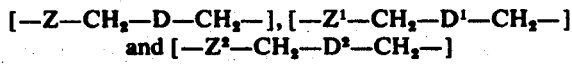

wherein D, D¹ and D² are selected from the group consisting of (a) the divalent hydrocarbon portion of a dimerized fat acid, and (b) the divalent hydrocarbon portion of a dibasic acid, and Z, Z¹ and Z² are as defined above. The preferred dimerized fat acids are those prepared by polymerizing a fat acid having at least eight and not more than 24 carbon atoms. The preferred dibasic acids are those having at least six and not more than 30 carbon atoms.

The various end groups of the preferred polymeric amines can be represented by the formula

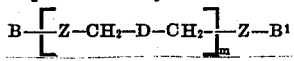

wherein B and B¹ are selected from the group consisting of H, R, $-CH_2DCN$, $-CH_2DCH_3$, and;

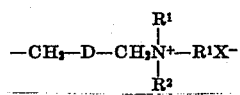

Z, D, R, R¹, R² and X are as defined above, and m is the number of units in the polymer chain and is at least two.

The preferred polymeric amines wherein D is the divalent hydrocarbon portion of a dimerized fat acid or a dibasic acid generally vary in molecular weight from dimers where m is 2 to polymers where m is 50 or greater.

The preferred branched chain polymeric amines are represented by the formula

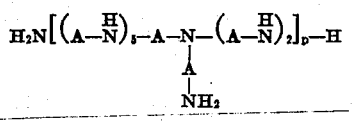

wherein p is an integer from 1 to 20 and A is as defined above.

Many of the polymeric amines useful in this invention and processes for their preparation are more fully described in Nordgren et al, U.S. Pat. No. 3,235,596, Vertnik, U.S. Pat. No. 3,217,028 and Dunning et al, U.S. Pat. No. 3,215,625, and the disclosures thereof are incorporated herein by reference. The processes described in the aforementioned patents also can be employed in the preparation of any of the polymeric amines useful in this invention.

Representative amino compounds corresponding to the above groups which can be used in accordance with the instant invention include by way of example and not limitation:

a. N-(1-methyltetradecyl)-1,3-propanediamine
N-tall oil alkyl-1,3-propandiamine
N-octadecyl-1,4-butanediamine
N,N-di(butyl)-1,3-propandiamine
N,N-di(dodecyl)-1,2-ethanediamine
N,N-di(3-aminopropyl)linolyl dimer diamine (dimer tetramine)
N,N'-di(3-aminopropyl)-1,6-hexanediamine
N,N'-di(3-aminopropyl)-1,10-decanediamine
N,N'-di(3-aminopropyl)-1,12-dodecanediamine
N,N'-di(3-aminopropyl)-1,18-octadecanediamine
N,N'-di(3-aminopropyl)-1,6-tetradecanediamine
N,N'-di(2-ethylhexyl)-1,2-ethanediamine
N-stearyl-1,6-hexanediamine
N-lauryl-1,2-ethanediamine
N-hexyl-1,10-dodecanediamine
N,N-dibenzyl-1,2-ethanediamine
Reductive polymerization product of dimeric linoleyl nitrile
Reductive polymerization product of dimeric linoleyl nitrile
Reductive polymerization product of adiponitrile
Triethylene tetramine
Diethylene triamine

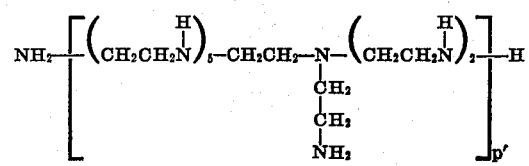

wherein p' is an integer from 1 to 3 are available commercially as polyamines N-400, N-800 and N-1200. Polyamine N-400 has the above formula wherein p' is 1.

b. 1,12-dodecane diamine
1,6-hexane diamine
1,6-hexene-3-diamine
1,8-octane diamine
1,10-decane diamine
1,9-nonane diamine
1,20-eicosene-10-diamine
1,7-heptene-2-diamine
1,36-hexatricontane diamine
1,13-tetradecane diamine
1,10-dodecane diamine
1,11-nonadecane diamine
the diamine derived from dimeric octadecadienonitrile (U.S. Pat. No. 2,460,733)

c. mixture of primary amines from coconut oil
n-octyl amine
n-decyl amine
n-hexadecyl amine
n-octadecyl amine
tall oil alkyl amine
oleyl amine
1-methylhexyl amine
1-methyldecyl amine
2-ethylhexyl amine
1,4-dimethyl pentyl amine
mixture of branched primary amines of 12 to 14 carbon atoms
mixture of branched primary amines of 18 to 22 carbon atoms
dimethyl hydrogenated tallow alkyl amine d. N,N-di(hydroxypropyl)stearylamine oxide
N,N,N-trioctylamine oxide
N,N-di(2-hydroxydodecyl)decylamine oxide
N,N-di(4-hydroxyoctyl)-n-butylamine oxide
N,N-di(hydroxyethyl)hexadecyl amine oxide
N,N-di(n-butyl)octylamine oxide
N,N-di(isopropyl)cocoalkylamine oxide N,N-di(n-propyl)decylamine oxide
N,N-di(ethyl)tetradecylamine oxide
N,N-di(ethyl)stearylamine oxide
N,N-di(ethyl)cocoalkylamine oxide
N,N-di(ethyl)octadecylamine oxide
N,N-di(methyl)octylamine oxide
e. 3-(9-methyloctadecyloxy)propyl amine
2-(tetradecyloxy)ethyl amine
3-(tall oil alkoxy)propyl amine
3-(n-dodecyloxy)propyl amine
3-(n-octadecyloxy)propyl amine
4-(n-octyloxy)butyl amine
2-(cocoalkyloxy)ethyl amine
3-(hydrogenated tallow alkoxy)propyl amine
4-(ethoxy)butyl amine
3-(2-ethylhexyloxy)propyl amine
4-(isopropoxy)butyl amine
f. 2-(tallow alkyl)ethylene imine
2-(methyl)ethylene imine
2-(dodecyl)ethylene imine
2-(octadecyl)ethylene imine
2-(n-butyl)ethylene imine
2-(2-ethylhexyl)ethylene imine
2-(ethyl)ethylene imine
2,2-(dimethyl)ethylene imine

| g. | Base Amine | Mols of Ethylene Oxide |
|---|---|---|
| | ethoxylated dibutyl amine | 6 |
| | ethoxylated hexadecyl amine | 10 |
| | ethoxylated stearyl amine | 6 |
| | ethoxylated dioctyl amine | 15 |
| | ethoxylated 1-methyltetradecyl amine | 12 |
| | ethoxylated soy alkyl amine | 2 |
| | ethoxylated oleyl amine | 30 |

| h. | Base Amine | Mols of Ethylene Oxide |
|---|---|---|
| | N-(1-methyltetradecyl)propane diamine | 3 |
| | N-(3-aminopropyl)tallow amine | 3 |
| | N-(3-aminopropyl)tallow amine | 10 |

| i. | Base Amine | Mols of Ethylene Oxide |
|---|---|---|
| | 2-(tallow alkyl)ethylene imine | 1 |
| | 2-(dodecyl)ethylene imine | 5 |
| | 2-(n-butyl)ethylene imine | 8 |
| | 2(octadecyl)ethylene imine | 2 |
| | 2-(methyl)ethylene imine | 25 |
| | 2-(2-ethylhexyl)ethylene imine | 12 |
| | 2,2-dimethyl ethylene imine | 10 |

The value of animal feeds generally has been determined directly by feeding the animal. Within the past few years, however, the in vitro rumen technique whereby the changes occuring in feeds brought about by microorganisms are measured more readily and with great accuracy has been employed more frequently in the evaluation of animal feeds. This technique involves the use of an apparatus in which the digestive processes of the animals are conducted and studied in vitro. The animal feeds, rumen inoculum and various growth promotants are introduced into and withdrawn from a laboratory unit under carefully controlled conditions and the changes taking place are studied critically and progressively during the consumption of the feed by the microorganisms. The result obtained by use of the aforesaid transplanted rumen technique have been confirmed in vivo by actual feeding of animals.

Several parameters have been employed in the above in vitro test methods to determine the effectiveness of the active growth promoting material. In the following examples the parameter employed in evaluating the amino compounds of the instant invention is the change in propionic acid content in the rumen fluids. An increase in the propionic acid content of the rumen fluid indicates that a desirable response in overall ruminant performance has been brought about the the amino compounds in the feed compositions. These in vitro observations have been confirmed by in vivo test methods in which rumen fluids are analyzed at the end of several days and by long-term in vivo feeding of ruminants over several months in which weight gain and feed efficiency are measured. The results of the long-term in vivo feeding studies show a reliable correlation between propionic acid increase in rumen fluid and improved animal performance.

In the examples of the present invention which follow, evaluation of the animal feed compositions containing the amino compounds of the instant invention is made by feeding ruminants a conventional feed ration without amino compounds (control animals) and conventional feed rations containing the various amino compounds. In many of the examples a modified in vivo procedure is used whereby the rumen fluids are analyzed after seven days of feeding. The rumen fluids are analyzed by a gas chromotographic procedure to determine the change of propionic acid content therein. The change in propionic acid content is expressed as percent of the propionic acid content found in the rumen of the control ruminants receiving the conventional feed composition without the amino compounds. In other examples long-term in vivo feeding studies are used to show the correlation between propionic acid increase in the rumen fluid and improved animal performance.

The following examples, in which parts and percent are expressed by weight unless otherwise indicated, further illustrate the advantages of this invention.

A basal ration having approximately the following composition was used in Examples 1 to 6.

| Component | Percent |
|---|---|
| Ground corn | 27.45 |
| Soybean meal (50%) | 18.90 |
| Defluorinated phosphate (18% P) | 0.81 |
| Iodized salt | 0.45 |
| Trace minerals | 0.09 |
| Ground corn cobs | 10.00 |
| Molasses | 8.10 |
| Chopped alfalfa hay | 34.20 |
| Vitamin A 10 MIU/gm | 275 gms/ton |

EXAMPLE 1

Five groups of sheep were fed the above basal ration containing about 0.005 percent of a polymeric secondary amine represented by the formula

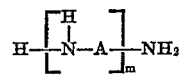

As a control, an additional group of sheep received the same basic diet not containing an amine additive. At the end of seven days of feeding, the rumen fluids were analyzed for propionic acid content by gas chromatography. Results and further details are given below in Table 1, wherein $t$ is the number of carbon atoms in the divalent aliphatic hydrocarbon, and $m$ is the number of units in the polymer.

TABLE 1

| polymeric amine | Mol. wt. | t | m | Propionic Acid Content of Rumen Fluid, Percent of Control |
|---|---|---|---|---|
| Reductive polymerization product of dimeric linoleyl nitrile | 8000 | 36 | 15 | 150 |
| Reductive polymerization product of dimeric linoleyl nitrile | 3000 | 36 | 5 | 148 |
| Reductive polymerization product of adiponitrile | 425 | 6 | 3 | 147 |
| Triethylene tetramine | 146 | 2 | 3 | 153 |
| Diethylene triamine | 103 | 2 | 2 | 122 |

EXAMPLE 2

Three groups of sheep were provided the above basal ration for 84 days, self-fed. The rations for two of the groups contained 0.0025 percent and 0.005 percent, respectively, of the reductive polymerization product of dimeric linoleyl nitrile having molecular weight of 8000, and the ration for the other group contained no polymeric amine additive. The average daily weight gain and feed efficiency observed for each level of application and for sheep fed the normal ration without the polymeric amine are set forth in Table 2.

TABLE 2

| Level % | Average Daily Gain, lb. | Feed Efficiency |
|---|---|---|
| 0 | 0.37 | 7.78 |
| 0.0025 | 0.41 | 7.06 |
| 0.0050 | 0.44 | 6.85 |

EXAMPLE 3

One group of sheep was fed the above basal ration containing about 0.01 percent of a polymeric tertiary amine of the formula

A second group of sheep was fed the above basal ration containing about 0.01 percent of a polymeric quaternary amine of the formula

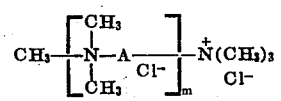

As a control, an additional group of sheep received the same basal ration without a polymeric amine additive.

At the end of seven days, the rumen fluids were analyzed for propionic acid content by gas chromotography. Results and further details are given below in Table 3, where $t$ is the number of carbon atoms in the divalent aliphatic hydrocarbon and $m$ is the number of units in the polymer.

TABLE 3

| Polymeric Amine | t | m | Propionic acid content of Rumen Fluid, Percent of Control |
|---|---|---|---|
| Polymeric tertiary amine prepared by alkylating the reductive polymerization product of dimeric linoleyl nitrile | 36 | 5 | 146 |
| Polymeric quaternary amine prepared by quaternizing the reductive polymerization product of dimeric linoleyl nitrile | 36 | 5 | 113 |

EXAMPLE 4

One group of sheep was fed the above basal ration containing 0.05 percent of the reductive polymerization product of adiponitrile having an average molecular weight of about 1136. Another group of sheep was fed the same basal ration without an amine additive to serve as control. The average daily weight gain and feed efficiency for each group of sheep over a 42 day period is set forth in Table 4 below.

TABLE 4

| Level % | Average daily gain, lb. | Feed efficiency |
|---|---|---|
| 0 | .34 | 8.6 |
| 0.05 | .39 | 7.4 |

EXAMPLE 5

The above basal ration was fed to four groups of sheep under substantially the same conditions as in Example 1 above. One group served as control. The basal ration for the other three groups contained 0.01 percent of various polymeric amines. At the end of 7 days of feeding, the rumen fluids were analyzed for propionic acid content by gas chromotography. Results and further details are given in Table 5 below.

TABLE 5

| Reductive Polymerization Product of | molecular weight | Propionic Acid Content of Rumen Fluid, Percent of Control |
|---|---|---|
| 1,7-dicyanoheptane | 570 | 167 |
| sebaconitrile | 606 | 131 |
| adiponitrile | 513 | 153 |

EXAMPLE 6

Numerous groups of sheep were fed a conventional feed composition as in Example 1. One group was fed a ration containing no amine additive, and served as a control. The other groups were fed the same basal ration containing about 0.005 percent (unless otherwise specified) of an amine additive of the present invention. After seven days of feeding, the rumen fluid of each animal was analyzed for propionic acid content. In each instance the propionic acid content of the rumen fluid of animals fed a diet containing an amine additive was significantly greater than that in the control animals. This data, illustrating the efficacy of the present invention, is set forth in the following table:

TABLE 6

| Amine | Propionic acid content, Percent of control |
|---|---|
| ethylene diamine | 121 |
| 1,3-propane diamine | 111 |
| 1,6-hexane diamine | 132 |
| 1,10-decane diamine | 132 |
| 1,11-undecane diamine | 132 |
| 1,12-dodecane diamine | 126 |
| dimer diamine | 140 |
| 9-amino-10-hydroxy stearyl amine | 146 |
| 9-dimethylamine-10-hydroxystearyl amine | 146 |
| 9-diethanolamino-10-hydroxystearyl amine | 163 |
| 9-dodecylamino-10-hydroxystearyl amine | 150 |
| mixture of primary amines from coconut oil | 168 |
| n-octyl amine | 108 |
| n-decyl amine | 115 |
| n-hexadecyl amine | 112 |
| n-octadecyl amine | 127 |
| tall oil alkyl amine | 216 |
| oleyl amine | 174 |
| 1-methylhexyl amine | 113 |
| 1-methyldecyl amine | 120 |
| 2-ethylhexyl amine | 155 |
| 1,4-dimethyl pentyl amine | 129 |
| mixture of branched primary amines of 12 to 14 carbon atoms | 140 |
| mixture of branched primary amines of 18 to 22 carbon atoms | 170 |
| dimethyl hydrogenated tallow alkyl amine | 142 |
| didodecyl amine | 138 |
| 1,4-dimethyl pentyl amine | 129 |
| tri-n-dodecyl amine | 108 |
| dimethyl octyl amine | 152 |
| dioctyl methyl amine | 157 |
| dioctadecyl amine | 131 |
| trioctyl amine | 186 |
| dimethyl lauryl amine | 171 |
| N,N-dimethyl(1-methyl decyl)amine | 179 |
| N,N-di(methyl)cocoalkylamine oxide | 158 |
| N,N-di(methyl)laurylamine oxide | 104 |
| N,N-di(methyl)myristylamine oxide | 125 |
| N,N-di(methyl)hexadecylamine oxide | 174 |
| N,N-di(methyl)hydrogenated tallow alkylamine oxide | 158 |
| N,N-di(methyl)stearylamine oxide | 125 |
| N,N-di(2-hydroxyethyl)cocoalkyl amine oxide | 158 |
| N,N-di(2-hydroxyethyl)stearyl amine oxide | 125 |
| N,N-di(2-hydroxyethyl)tallowalkyl amine oxide | 158 |
| N,N,N-tri(n-dodecyl)amine oxide | 135 |
| methoxypropylamine | 129 |
| methoxyethylamine | 136 |
| tridecyloxypropylamine | 143 |
| 2-(ethyl)ethylene imine | 161 |
| propylene imine | 152 |
| N-(2-hydroxyethyl)ethylene imine | 139 |
| N,N-dibenzyl-1,2-ethanediamine | 129 |
| N,N-dibutylaminopropylamine | 171 |
| N-aminopropyl-1-methyldecylamine | 146 |
| N-(1-methyltetradecyl)-1,3-propanediamine | 190 |
| N,N-tall oil alkyl-1,3-propanediamine | 136 |
| N-loralkyl-1,2-ethanediamine | 155 |
| N-(3-aminopropyl)methylamine | 112 |
| N,N,N',N'-(tetramethyl)dimerdiamine | 112 |
| dimer tetramine | 142 |
| dimer tetramine (0.01 wt. percent) | 120 |
| dimer tetramine (0.001 wt. percent) | 154 |
| mixture of N,N-di(3-aminopropyl)-1,10-nonadecanediamine and N,N'-di(3-aminopropyl)-1,11-nonadecane diamine | 175 |

| Amine base | Mols of Ethylene Oxide | Propionic acid content Percent of control |
|---|---|---|
| Mixed cocoalkyl amine | 0 | 168 |
|  | 2 | 185 |
|  | 5 | 125 |
|  | 10 | 140 |
|  | 15 | 140 |
| Stearyl amine | 0 | 127 |
|  | 2 | 195 |
|  | 5 | 190 |
|  | 10 | 150 |
| Oleyl amine | 0 | 174 |
|  | 2 | 168 |
|  | 5 | 142 |
| 1-methyl decyl amine | 0 | 113 |
|  | 15 | 138 |
| Mixed branched alkyl amines ($C_{18}$ to $C_{22}$) | 0 | 170 |
|  | 1 | 140 |
|  | 5 | 140 |
|  | 15 | 180 |
|  | 25 | 175 |
| Mixed branched alkyl amines ($C_{12}$ to $C_{14}$) | 0 | 140 |
|  | 1 | 175 |
|  | 15 | 180 |
| Tallow amine | 0 | 168 |
|  | 2 | 204 |
|  | 5 | 223 |
|  | 15 | 266 |
| N-(1-methyltetradecyl) propane diamine | 3 | 117 |
| N-(3-aminopropyl) tallow amine | 3 | 233 |
| N-(3-aminopropyl) tallow amine | 10 | 248 |

EXAMPLE 7

Three groups of heifers were provided the following basal ration for 82 days, self fed:

| Component | Percent |
|---|---|
| Chopped alfalfa (14%) | 37.0 |
| Ground corn | 39.4 |
| Molasses | 8.0 |
| Soybean meal (50%) | 13.0 |
| Dicalcium phosphate | 0.6 |
| Ground limestone | 0.9 |
| Trace minerals | 0.1 |
| Ground corn cobs | 1.0 |

The rations for two of the groups contained 0.005 percent and 0.010 percent, respectively, of the reductive polymerization product of dimeric linoleyl nitrile having molecular weight of about 8000. The ration for the other group contained no polymeric amine additive and served as control. The average daily weight gain and feed efficiency observed for each level of application and for the heifers fed the basal ration without polymeric amine additive are set forth below in Table 7.

TABLE 7

| Level | Average daily gain, lb. | Feed Efficiency |
|---|---|---|
| 0 | 1.78 | 7.9 |
| 0.005 | 1.99 | 7.25 |
| 0.010 | 2.17 | 6.56 |

The amino compounds useful in this invention are incorporated in animal feed compositions in an effective amount over a wide range of concentrations. Significant animal responses are obtained with feed compositions containing from about 0.0001 percent by weight to about 0.1 percent by weight of the amino compound. Preferably, the feed compositions contain from about 0.0005 percent by weight to about 0.05 percent by weight of the amino compound.

Based on a fattening lamb consuming about 3 pounds of ration per day and cattle each consuming about 20 pounds of ration per day, the amino compounds are administered to sheep in an amount from about 0.0013 gm. to about 1.3 gm. per head per day, and to cattle in an amount from about 0.009 gm. to about 9.0 gm. per head per day. The amino compounds are preferably administered to sheep in an amount from about 0.007 gm. to about 0.7 gm. per head per day and to cattle in an amount from about 0.045 to about 4.5 gm. per head per day. However, the preferred amount will vary to some extent depending upon the age, weight and environment of the particular species of animal being fed.

The oral administration of the amino compounds in accordance with this invention can be accomplished in the form of tablets, capsules, powders, solutions, suspensions or in admixture with one or more components of the animal's diet. Alternatively, the amino compounds can be administered in an equivalent amount in the animal's drinking water.

Conventional ruminant feed rations generally comprise at least about 2 percent plant ingredients such as hay, straw, silage, yellow corn, pasturage, ground corn cobs, cottonseed hulls, cotton mill wastes, beet pulp, corn meal, soybean meal, wheat bran, wheat middlings, dehydrated alfalfa, ground oats, millet, linseed meal, coconut meal, distillers, dried grains, peanut meal, cottonseed meal and the like plant products. Most ruminant feed rations also contain up to about 2 percent mineral ingredients such as bone meal, limestone, salt (NaCl) and the various trace minerals including salts of zinc, copper, manganese, cobalt, iodine, iron and the like. Other materials which can be incorporated into ruminant feed rations in varying amounts include animal ingredients such as fish meal, meat and bone scraps, dried milk, animal fats, dried whey solubles and the like; vitaminaceous ingredients such as vitamins A, $B_{12}$, D and K, as well as the B vitamins such as riboflavin, niacin, pantothenic acid or salts thereof, choline, pyridoxine, thiamine, nicotinic acid or salts thereof, biotin, folic acid and the like; amino acids such as methionine, phenylalanine, arginine, glycine, histidine, isoleucine, leucine, lysine, threonine, tryptophan, valine and the like; medicaments such as antibiotics, steroids, arsenicals, anthelmintics and the like, and antioxidants, for example, 6-ethoxy-2,2,4-trimethyl-1,2-dihydroquinoline, butylated hydroxy anisol, butylated hydroxy toluene, 4,4-bis(2,6-di-t-butyl phenol), gammatocopherol, esters of gallic acid, and the like.

The feed compositions of this invention can be prepared by incorporating the amino compounds in various ways into any or all components of conventional diets for the type of animal in question. The amino compounds can be added to the diet rations as the pure compounds, as a stabilized concentrate wherein the amino compound is coated with a protective material such as gelatine or gelatine and sugar, as an adsorbate on silica gel, oatmeal, soybean meal, ion-exchange resins, as a simple admixture with a diluent such as cereal meal, and oil meal and stabilizers, or in solution or emulsion in a vegetable oil such as peanut oil, soybean oil, sesame oil and the like and preferably including a stabilizer. An oil solution or emulsion lends itself to spraying on the basal ration. Alternatively, the amino compounds can be mixed with other feed additives such as vitamins, antibiotics, minerals and other materials of this nature in a feed supplement which is supplied to grain mills or to feed manufacturers who then incorporate it into the finished diet to be supplied to the animals by the farmer. Blending of such materials can be accomplished in the usual type apparatus used for the preparation of dry feed products. For young animals the amino compounds can be incorporated into liquid or semi-liquid feeds or mashes in the form of a suspension or dispersion of the active material. An emulsion or dispersion in peanut oil, soybean oil, and the like can be prepared and these are particularly adapted for liquid compositions including drinking water. The amino compounds can be administered alone to the animals but it is more convenient and effective to use the active material in the animals' feed composition.

Although the invention is described with respect to specific modifications, the details thereof are not to be construed as limitations except to the extent indicated in the following claims.

What is claimed is:

1. A method of increasing growth response in an animal selected from the group consisting of poultry, swine and ruminants which comprises feeding said animal an effective growth increasing amount of an amino compound selected from the group consisting of a. polymeric amine having at least two and not more than 50 units selected from the group consisting of $$[-Z-A-], [Z^1-A^1-] \text{ and } [-Z^2-A^2-]$$

wherein A, $A^1$ and $A^2$ are each divalent aliphatic hydrocarbon of at least two and not more than 48 carbon atoms, and Z, $Z^1$ and $Z^2$ are each selected from the group consisting of

wherein R is alkyl of not more than 20 carbon atoms;

b. $H_2N - R^2 - NH_2$ wherein $R^2$ is an aliphatic hydrocarbon of at least two and not more than 40 carbon atoms;

c.

wherein $R^7$, $R^8$ and $R^9$ are each selected from the group consisting of alkyl of not more than 20 carbon atoms and hydroxyalkyl of not more than 20 carbon atoms, provided that the sum of the carbon atoms are at least eight and not more than 40; and d. $R^{10} - O - (CH_2)_c - NH_2$ wherein $R^{10}$ is selected from the group consisting of alkyl of not more than 18 carbon atoms and alkenyl of not more than 18 carbon atoms, and $c$ is an integer from 2 to 4 inclusive.

2. A method in accordance with claim 1 wherein the animal is a ruminant and the amino compound is selected from the group consisting of polymeric amine having at least two and not more than 50 units selected from the group consisting of $$]-Z-A-], [Z^1-A^1-] \text{ and } [-Z^2-A^2-]$$

wherein A, $A^1$ and $A^2$ are each divalent aliphatic hydrocarbon of at least two and not more than 48 carbon atoms, and Z, $Z^1$ and $Z^2$ are each selected from the group consisting of

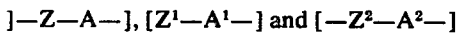

wherein R is alkyl of not more than 20 carbon atoms.

3. A method in accordance with claim 1 wherein the animal is a ruminant and the amino compound is selected from the group consisting of $$H_2N - R^3 - NH_2$$

wherein $R^3$ is an aliphatic hydrocarbon of at least two and not more than 40 carbon atoms.

4. A method in accordance with claim 1 wherein the animal is a ruminant and the amino compound is selected from the group consisting of

wherein $R^7$, $R^8$ and $R^9$ are each selected from the group consisting of alkyl of not more than 20 carbon atoms and hydroxylalkyl of not more than 20 carbon atoms, provided that the sum of the carbon atoms are at least eight and not more than 40.

5. A method in accordance with claim 1 wherein the animal is a ruminant and the amino compound is selected from the group consisting of $$R^{10} - O - (CH_2)_c - NH_2$$

wherein $R^{10}$ is selected from the group consisting of alkyl of not more than 18 carbon atoms and alkenyl of not more than 18 carbon atoms and $c$ is an integer from 2 to 4 inclusive.

6. A method in accordance with claim 2 wherein Z, $Z^1$ and $Z^2$ are

7. A method in accordance with claim 2 wherein the divalent hydrocarbon has 36 carbon atoms.

8. A method in accordance with claim 7 wherein Z, $Z^1$ and $Z^2$ are

9. A method in accordance with claim 3 wherein the amino compound is 1,6-hexane diamine.

10. A method in accordance with claim 4 wherein $R^7$ and $R^8$ are hydroxyalkyl.

11. A method in accordance with claim 5 wherein $R^{10}$ is alkyl.

12. A method in accordance with claim 6 wherein the alkane is ethane and the number of units in the polymer chain is not more than 3.

13. A method in accordance with claim 7 wherein the number of units in the polymer chain is about 15.

14. An animal feed composition comprising an animal feed and as an essential active ingredient therein an effective growth increasing amount of from about 0.0001 to about 0.1 percent by weight of the total feed of an amino compound selected from the group consisting of:

a. polymeric amine having at least two and not more than 50 units selected from the group consisting of $$[-Z-A-], [-Z^1-A^1-] \text{ and } [-Z^2-A^2-]$$

wherein A, $A^1$ and $A^2$ are each divalent aliphatic hydrocarbon of at least two and not more than 48 carbon atoms, and Z, $Z^1$ and $Z^2$ are each selected from the group consisting of

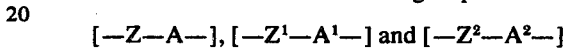

wherein R is alkyl of not more than 20 carbon atoms;

b. $H_2N - R^3 - NH_2$ wherein $R^3$ is an aliphatic hydrocarbon of at least two and not more than 40 carbon atoms;

c.

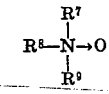

wherein $R^7$, $R^8$ and $R^9$ are selected from the group consisting of alkyl of not more than 20 carbon atoms and hydroxyalkyl of not more than 20 carbon atoms, provided that the sum of the carbon atoms are at least eight and not more than 40; and d. $R^{10} - O - (CH_2)_c - NH_2$ wherein $R^{10}$ is selected from the group consisting of alkyl of not more than 18 carbon atoms and alkenyl of not more than 18 carbon atoms and c is an integer from 2 to 4 inclusive.

15. A composition in accordance with claim 14 wherein the amino compound is selected from the group consisting of polymeric amine having at least two and not more than 50 units selected from the group consisting of $$[-Z-A-], [-Z^1-A^1-] \text{ and } [-Z^2-A^2-]$$

wherein A, $A^1$ and $A^2$ are each divalent aliphatic hydrocarbon of at least two and not more than 48 carbon atoms, and Z, $Z^1$ and $Z^2$ are each selected from the group consisting of

wherein R is alkyl of not more than 20 carbon atoms.

* * * * *

UNITED STATES PATENT OFFICE
CERTIFICATE OF CORRECTION

Patent No. 3,697,659    Dated October 10, 1972

Inventor(s) Gino J. Marco

It is certified that error appears in the above-identified patent and that said Letters Patent are hereby corrected as shown below:

Column 4, line 28, "cycloalkyl" should read -- cycloalkenyl --.

Column 16, line 50, in Claim 1, that portion of the formula reading "—$R^2$—" should read -- —$R^3$— --.

Column 17, line 10, in Claim 2, the first bracket reading "$]$" should read -- $[$ --.

Signed and sealed this 18th day of December 1973.

(SEAL)
Attest:

EDWARD M. FLETCHER, JR.　　　　RENE D. TEGTMEYER
Attesting Officer　　　　　　　Acting Commissioner of Patents